(12) United States Patent
Ahmed et al.

(10) Patent No.: US 10,308,524 B1
(45) Date of Patent: Jun. 4, 2019

(54) PRESSURE-REDUCED SALINE WATER TREATMENT SYSTEM

(71) Applicant: KUWAIT INSTITUTE FOR SCIENTIFIC RESEARCH, Safat (KW)

(72) Inventors: Mansour Ahmed, Safat (KW); Rajesha Kumar, Safat (KW); Bhadrachari Garudachari, Safat (KW); Yousef Jassim Easa Al-Wazzan, Safat (KW); Jibu Pallickel Thomas, Safat (KW)

(73) Assignee: Kuwait Institute for Scientific Research, Safat (KW)

( * ) Notice: Subject to any disclaimer, the term of this patent is extended or adjusted under 35 U.S.C. 154(b) by 0 days.

(21) Appl. No.: 16/247,825

(22) Filed: Jan. 15, 2019

(51) Int. Cl.
*C02F 1/00* (2006.01)

(52) U.S. Cl.
CPC .................................... *C02F 1/00* (2013.01)

(58) Field of Classification Search
CPC .... C02F 1/00; C02F 1/001; C02F 1/44; C02F 1/441; C02F 1/445; C02F 9/00; C02F 2103/08; C02F 2201/007
USPC ........ 210/321.66, 170.11, 195.2, 252, 257.2, 210/258, 321.6, 323.1, 300, 335, 433.1, 210/489
See application file for complete search history.

(56) References Cited

U.S. PATENT DOCUMENTS

| | | | |
|---|---|---|---|
| 9,248,405 B2 | 2/2016 | McGinnis et al. | |
| 2006/0144789 A1* | 7/2006 | Cath | B01D 61/002 210/641 |
| 2006/0237366 A1* | 10/2006 | Al-Mayahi | B01D 61/002 210/644 |
| 2010/0155329 A1* | 6/2010 | Iyer | B01D 61/002 210/636 |
| 2011/0278226 A1* | 11/2011 | Nicoll | B01D 61/002 210/639 |

(Continued)

FOREIGN PATENT DOCUMENTS

KR    20130039367 A    4/2013
KR    101344783 B1    12/2013

OTHER PUBLICATIONS

Ali et al. "Pilot-scale investigation of forward/reverse osmosis hybrid system for seawater desalination using impaired water from steel industry." International Journal of Chemical Engineering 2016 (2016).

*Primary Examiner* — Allison G Fitzsimmons
(74) *Attorney, Agent, or Firm* — Richard C. Litman

(57) ABSTRACT

The pressure-reduced saline water treatment system combines both forward osmosis and reverse osmosis techniques for the desalination of salt water, such as seawater. A feed side of the reverse osmosis desalination unit is in fluid communication with the feed side of the forward osmosis desalination unit, such that seawater drawn through the feed side of the forward osmosis desalination unit is fed into the feed side of the reverse osmosis desalination unit. The reverse osmosis desalination unit outputs product water extracted from the seawater from a permeate side thereof. The feed side of the reverse osmosis desalination unit outputs a reject stream, which is fed to a draw side of the forward osmosis desalination unit, such that the draw side of the forward osmosis desalination unit receives the reject stream and outputs concentrated brine.

12 Claims, 4 Drawing Sheets

(56) References Cited

U.S. PATENT DOCUMENTS

| | | | |
|---|---|---|---|
| 2012/0012511 A1* | 1/2012 | Kim | B01D 61/002 210/170.11 |
| 2012/0279921 A1* | 11/2012 | Nicoll | B01D 61/002 210/648 |
| 2014/0102982 A1 | 4/2014 | Fairchild | |
| 2014/0116943 A1* | 5/2014 | Nakano | B01D 61/002 210/641 |
| 2015/0273396 A1 | 10/2015 | Hancock et al. | |
| 2016/0002073 A1 | 1/2016 | Nowosielski-Slepowron | |
| 2017/0217789 A1 | 8/2017 | Beitelmal et al. | |
| 2017/0349467 A1 | 12/2017 | Blohm et al. | |
| 2018/0028977 A1 | 2/2018 | Ghaffour et al. | |
| 2018/0128250 A1 | 5/2018 | Iyer | |
| 2018/0186663 A1 | 7/2018 | Hong et al. | |

* cited by examiner

PRESSURE-REDUCED SALINE WATER TREATMENT SYSTEM

BACKGROUND

1. Field

The disclosure of the present patent application relates to water treatment, and particularly to a system for desalinating water using a pressure-reduced reverse osmosis system.

2. Description of the Related Art

Reverse osmosis (RO) is typically used in water purification systems. These systems typically include a semipermeable membrane to remove ions, molecules, and larger particles from water. In reverse osmosis, an applied pressure is used to overcome osmotic pressure, a colligative property that is driven by chemical potential differences of the solvent. Reverse osmosis can remove many types of dissolved and suspended species from water, including bacteria, and is used in both industrial processes and the production of potable water. The result is that the solute is retained on the pressurized side of the membrane and the pure solvent is allowed to pass to the other side. The semipermeable membrane is considered to be "selective"; i.e., the membrane does not allow large molecules or ions through its pores, but does allow smaller components of the solution (such as solvent molecules) to pass freely.

In reverse osmosis, the efficiency of the process is dependent on pressure, flow rate and other conditions. Reverse osmosis is most commonly known for its use in purification of seawater, e.g., for removing the salt and other effluent materials from the water. FIG. 4 illustrates a basic prior art reverse osmosis desalination unit 300, where seawater S is fed into unit 300 for production of purified water PW. As shown in FIG. 4, a high pressure pump 312 is used to force water across the semi-permeable reverse osmosis membrane 316 from the concentrated side 314 of the reverse osmosis desalination unit 300. An efficient RO process can leave almost all (around 95% to 99%) of dissolved salts behind in the reject stream; i.e., output concentrated brine B. The amount of pressure applied by pump 312 depends on the salt concentration of the feed water. The more concentrated the feed water, the more pressure is required to overcome the osmotic pressure. The desalinated water that is demineralized or deionized (i.e., purified water PW) is typically referred to as the "permeate" or the "product water".

In forward osmosis (FO), water flows through a semipermeable membrane from an area of low solute concentration to an area of high solute concentration based on the osmotic pressure difference. A "draw" solution or solution of high concentration relative to that of the feed solution is used to induce a net flow of water through the membrane into the draw solution, thus effectively separating the feed water from its solutes. In contrast, the reverse osmosis process described above uses hydraulic pressure as the driving force for separation, which serves to counteract the osmotic pressure gradient. Thus, significantly more energy is required for reverse osmosis compared to forward osmosis.

FIG. 5 illustrates a basic prior art forward osmosis unit 400, where the feed solution (i.e., seawater S) is fed into the feed side of unit 400 under pressure applied by pump 412. The feed solution passing through the feed side 414 separates such that pure water passes through the semi-permeable membrane 416, resulting in reject concentrated brine B exiting unit 400. Concentrated draw solution CD fed into the draw side 420 of unit 400 under pressure applied by pump 418 draws in pure water from the feed side 414 due to the osmotic pressure gradient between the feed side and the draw side. Diluted draw solution DD, which has been diluted by the pure water flowing through the semi-permeable membrane 416, is then drawn from the draw side 420 of unit 400. In the reverse osmosis process illustrated in FIG. 4, the permeate water PW is purified and ready for use. However, in the forward osmosis process illustrated in FIG. 5, the membrane separation of the forward osmosis process results in a "trade" between the solutes of the feed solution S and the draw solution CD.

Generally, the operating pressures necessary for reverse osmosis are very high. The requirement of such high pressure for desired efficiency levels is costly, both in terms of power consumption and maintenance. With regard to the latter, high pressure operation causes rapid fouling and scaling in the membrane, requiring frequent replacement and/or maintenance. Additionally, all materials of the system must be rated for high pressure operation, often requiring the usage of expensive materials, such as stainless steel. It would obviously be desirable to be able to make use of reverse osmosis, assisted by forward osmosis, but operating at much lower pressures. Thus, a pressure-reduced saline water treatment system solving the aforementioned problems is desired.

SUMMARY

The pressure-reduced saline water treatment system can include both forward osmosis and reverse osmosis units for the desalination of salt water, such as seawater. The pressure-reduced saline water treatment system includes a forward osmosis desalination unit, which has a feed side and a draw side, and a reverse osmosis desalination unit, which has a feed side and a permeate side, as are conventionally known. The feed side of the reverse osmosis desalination unit is in fluid communication with the feed side of the forward osmosis desalination unit, such that seawater drawn through the feed side of the forward osmosis desalination unit is fed into the feed side of the reverse osmosis desalination unit. A first pump may inject the seawater, under pressure, through the feed side of the forward osmosis desalination unit. A second pump may deliver the seawater from the feed side of the forward osmosis desalination unit to the feed side of the reverse osmosis desalination unit.

The reverse osmosis desalination unit performs reverse osmosis desalination on the seawater fed into the feed side, outputting product water extracted from the seawater from the permeate side. The feed side of the reverse osmosis desalination unit outputs a reject stream. The draw side of the forward osmosis desalination unit is in fluid communication with the feed side of the reverse osmosis desalination unit, such that the draw side of the forward osmosis desalination unit receives the reject stream and outputs concentrated brine. Power for the first and second pumps may be provided by any suitable type of power source, such as at least one photovoltaic panel in electrical communication therewith for providing suitable electrical power. It should be understood that any suitable source of electrical power may be utilized, including other types of "green" electrical generation systems.

The pressure-reduced saline water treatment system is a closed system, where the hydraulic pressure applied in the reverse osmosis desalination unit has an influence on the water transport mechanism within the forward osmosis desalination unit. Because of the hydraulic pressure associated with the reject stream coming from the reverse osmosis desalination unit, the water transport in the forward osmosis desalination unit takes place from a high osmotic pressure stream to a lower osmotic pressure stream, which is opposite the working principle of conventional forward osmosis processes; i.e., the reject stream passes through the draw side of the forward osmosis desalination unit at a higher osmotic pressure than an osmotic pressure of the seawater fed through the feed side of the forward osmosis desalination unit.

In an alternative embodiment of the pressure-reduced saline water treatment system, a two-stage forward osmosis process is used. Both a first forward osmosis desalination unit, having a feed side and a draw side, and a second forward osmosis desalination unit, also having a feed side and a draw side, are used. As in the previous embodiment, a reverse osmosis desalination unit, having a feed side and a permeate side, is provided. The feed side of the reverse osmosis desalination unit is in fluid communication with the feed side of the second forward osmosis desalination unit, such that seawater drawn through the feed side of the second forward osmosis desalination unit is fed into the feed side of the reverse osmosis desalination unit. The permeate side of the reverse osmosis desalination unit outputs pure product water, and the feed side of the reverse osmosis desalination unit outputs a reject stream.

The feed side of the second forward osmosis desalination unit is in fluid communication with the feed side of the reverse osmosis desalination unit, such that the draw side of the second forward osmosis desalination unit receives the reject stream from the reverse osmosis desalination unit and outputs a concentrated reject stream. The draw side of the first forward osmosis desalination unit is in fluid communication with the draw side of the second forward desalination unit, such that the draw side of the first forward osmosis desalination unit receives the concentrated reject stream from the second forward osmosis desalination unit and outputs concentrated brine.

The feed side of the first forward osmosis desalination unit is in fluid communication with the feed side of the second forward osmosis desalination unit, such that the seawater flows through the feed side of the first forward osmosis desalination unit to and through the feed side of the second forward osmosis desalination unit. The reject stream from the reverse osmosis desalination unit passes through the draw side of the second forward osmosis desalination unit at a higher osmotic and hydraulic pressure than an osmotic pressure of the seawater fed through the feed side of the second forward osmosis desalination unit. The concentrated reject stream from the second forward osmosis desalination unit passes through the draw side of the first forward osmosis desalination unit at a higher osmotic and hydraulic pressure than an osmotic pressure of the seawater fed through the feed side of the first forward osmosis desalination unit. In an embodiment, the operating pressure of the system can about 15 bar.

As in the previous embodiment, a first pump delivers the seawater to the feed side of the first forward osmosis desalination unit, and a second pump delivers the seawater from the feed side of the second forward osmosis desalination unit to the feed side of the reverse osmosis desalination unit. Also, as in the previous embodiment, the first and second pumps may be powered by at least one photovoltaic panel or any other suitable source of energy.

In a further alternative embodiment of the pressure-reduced saline water treatment system, a three-stage forward osmosis process is used. First, second and third forward osmosis desalination units are used, each having a feed side and a draw side. As in the previous embodiment, a reverse osmosis desalination unit, having a feed side and a permeate side, is provided. The feed side of the reverse osmosis desalination unit is in fluid communication with the feed side of the third forward osmosis desalination unit, such that seawater drawn through the feed side of the third forward osmosis desalination unit is fed into the feed side of the reverse osmosis desalination unit. The permeate side of the reverse osmosis desalination unit outputs product water, and the feed side of the reverse osmosis desalination unit outputs a reject stream.

The draw side of the third forward osmosis desalination unit is in fluid communication with the feed side of the reverse osmosis desalination unit, such that the draw side of the third forward osmosis desalination unit receives the reject stream and outputs a first concentrated reject stream. The draw side of the second forward osmosis desalination unit is in fluid communication with the draw side of the third forward osmosis desalination unit, such that the draw side of the second forward osmosis desalination unit receives the first concentrated reject stream and outputs a second concentrated reject stream. The draw side of the first forward osmosis desalination unit is in fluid communication with the draw side of the second forward osmosis desalination unit, such that the draw side of the first forward osmosis desalination unit receives the second concentrated reject stream and outputs concentrated brine.

The feed side of the first forward osmosis desalination unit is in fluid communication with the feed side of the second forward osmosis desalination unit, such that the seawater flows through the feed side of the first forward osmosis desalination unit to and through the feed side of the second forward osmosis desalination unit. The feed side of the second forward osmosis desalination unit is in fluid communication with the feed side of the third forward osmosis desalination unit, such that the seawater flows through the feed side of the second forward osmosis desalination unit to and through the feed side of the third forward osmosis desalination unit. Similar td the previous embodiments, the reject stream of the reverse osmosis desalination unit passes through the draw side of the third forward osmosis desalination unit at a higher osmotic and hydraulic pressure than an osmotic pressure of the seawater fed through the feed side of the third forward osmosis desalination unit. The first concentrated reject stream passes through the draw side of the second forward osmosis desalination unit at a higher osmotic and hydraulic pressure than an osmotic pressure of the seawater fed through the feed side of the second forward osmosis desalination unit. The second concentrated reject stream passes through the draw side of the first forward osmosis desalination unit at a higher osmotic and hydraulic pressure than an osmotic pressure of the seawater fed through the feed side of the first forward osmosis desalination unit.

As in the previous embodiments, a first pump delivers the seawater to the feed side of the first forward osmosis desalination unit, and a second pump delivers the seawater from the feed side of the third forward osmosis desalination unit to the feed side of the reverse osmosis unit. Also as in the previous embodiments, the first and second pumps may be powered by at least one photovoltaic panel or any other suitable source of energy.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
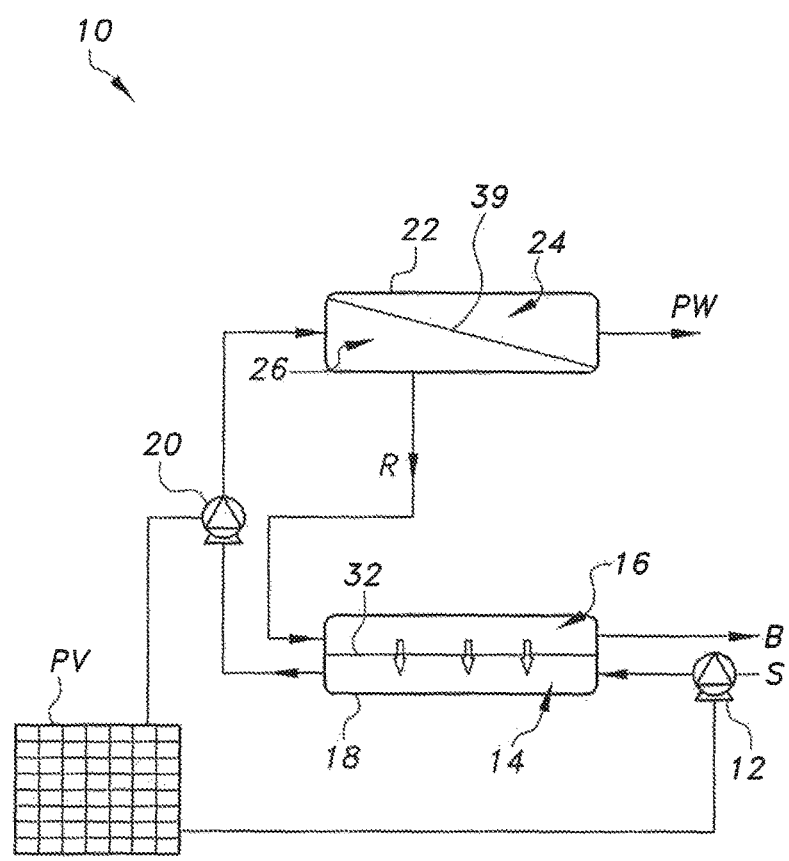
FIG. 1 diagrammatically illustrates a pressure-reduced saline water treatment system.

As shown in FIG. 1, the pressure-reduced saline water treatment system 10 includes a forward osmosis desalination unit 18, which has a feed side 14 and a draw side 16, and a reverse osmosis desalination unit 22, which has a permeate side 24 and a feed side 26, as are conventionally known. The feed side 26 of reverse osmosis desalination unit 22 is in fluid communication with the feed side 14 of forward osmosis desalination unit 18, such that the diluted seawater, from the feed side 14 of forward osmosis desalination unit 18, is fed into the feed side 26 of reverse osmosis desalination unit 22. A first pump 12 may inject the seawater S, under low pressure, through the feed side 14 of the forward osmosis desalination unit. A second pump 20 may deliver the diluted seawater from the feed side 14 of the forward osmosis desalination unit 18 to the feed side 26 of the reverse osmosis desalination unit 22.

The reverse osmosis desalination unit 22 performs reverse osmosis desalination on the seawater fed into feed side 26, outputting product water PW, from permeate side 24. The feed side 26 of reverse osmosis desalination unit 22 outputs a reject stream R. The draw side 16 of forward osmosis desalination unit 18 is in fluid communication with the feed side of reverse osmosis desalination unit 22, such that the draw side 16 of forward osmosis desalination unit 18 receives the reject stream R and outputs concentrated brine B. Power for the first and second pumps 12, 20, respectively, may be provided by any suitable type of power source, such as at least one photovoltaic panel PV in electrical communication therewith for providing suitable electrical power. It should be understood that first and second pumps 12, 20 may be powered by any suitable source of power, such as a conventional electrical grid, the at least one photovoltaic panel PV, wind turbines or the like.

It should be noted that the pressure-reduced saline water treatment system 10 is a closed system, where the hydraulic pressure applied in the reverse osmosis desalination unit (delivered via second pump 20) has an influence on the water transport mechanism within the forward osmosis desalination unit 18. The hydraulic pressure associated with the reject stream R coming from reverse osmosis desalination unit 22, counteracts the osmotic pressure gradient that would otherwise favor water flux from the seawater S passing through the feed side 14 to the reject stream R passing through draw side 16 in the forward osmosis desalination unit 18. As such, the water transport in the forward osmosis desalination unit 18 takes place from a high osmotic pressure stream (i.e., the reject stream R passing through draw side 16) to a lower osmotic pressure stream (i.e., the seawater S passing through the feed side 14), which is opposite the working principle of conventional forward osmosis processes.

This operating principle allows the reverse osmosis unit 22 to operate at much lower pressures than in conventional reverse osmosis systems. The low operating pressure of reverse osmosis unit 22 will directly enhance the life of reverse osmosis membrane 39 by reducing fouling and scaling thereof. The energy consumption of reverse osmosis unit 22 will also be far less than that of a conventional RO system, making pressure-reduced saline water treatment system 10 practical for a wide variety of applications ranging from domestic production of potable water to industrial scale desalination. The low energy consumption will also allow pressure-reduced saline water treatment system 10 to be easily integrated into a wide variety of power systems, such as those based on solar energy, wind energy, geothermal energy or any other suitable source of green energy.

Due to their larger energy consumption, present reverse osmosis desalination plants are impractical when it comes to integration with photovoltaic (PV) energy, particularly due to the very large surface area which must be covered by PV panels to operate the RO plant. The lower power requirements of pressure-reduced saline water treatment system 10 will allow for the usage of PV energy without such large area "footprint" considerations.

The decreased energy consumption of pressure-reduced saline water treatment system 10 has immediate benefits in terms of lower energy consumption expenses, as well as lower operating expenses, due to the increased lifetime of membranes 30, 32 due to the lower hydraulic pressure. The decrease in maintenance costs and time also provides for increased plant availability. Further, existing RO desalination plants can easily be retrofitted with a forward osmosis (FO) unit in order to convert the existing plant into a plant similar to pressure-reduced saline water treatment system 10.

Further, due to the ease of integration of pressure-reduced saline water treatment system 10 with green power sources, as discussed above, environmental problems associated with the burning of fossil fuels to supply energy for conventional RO desalination plants are not a concern. Further, whereas a conventional RO plant uses high pressure pumps, first and second pumps 12, 20 in the pressure reduced saline water treatment system 10 operate at significantly decreased pressures, thus improving general plant safety and removing the risk of noise pollution. Further, the usage of low pressure allows for the replacement of stainless-steel materials (as are used in high pressure RO systems) with more cost-effective plastic materials.

Additionally, as noted above, by reducing the fouling and scaling issues related to conventional RO techniques, the frequency of chemical cleaning and membrane replacement is reduced. The use of a low operating pressure also replaces the expensive high pressure and corrosion resistant pipes, valves and fittings of conventional RO systems with plastic or glass reinforced polyester (GRP) materials.

As a non-limiting example, seawater may be fed into feed side 14 of forward osmosis desalination unit 18, by first pump 12, at an operating pressure of 1 to 2 bar. Corresponding to this example, the output stream of feed side 14 of forward osmosis desalination unit 18 may be pressurized by second pump 20 to about 30 bars. In experiments performed on pressure-reduced saline water treatment system 10 using these pressure values, no product water from permeate side 24 of reverse osmosis desalination unit 22 was observed for the first two minutes of operation. The reject stream R from feed side 26 of reverse osmosis desalination unit 22 entered draw side 16 of forward osmosis desalination unit 18 at a hydraulic pressure of about 28 bar.

Subsequently, water transport occurred from draw side 16 to feed side 14, across the FO membrane 32, due to the hydraulic pressure faced by reject stream R as it passed through draw side 16. As noted above, this is opposite to the general separation principle used in conventional FO; i.e., pure water is transported from the high osmotic pressure brine side (i.e., draw side 16) to the low osmotic pressure seawater side (i.e., feed side 14). This results in further dilution of the seawater intake stream S and further concentration of the brine B. In experiments, the pressure-reduced saline water treatment system 10 attained its state of equilibrium after two minutes of operation, during which the total dissolved solids (TDS) of the seawater fed into feed side 26 of reverse osmosis desalination unit 22 dropped to 20,123 ppm from its initial value of 42,121 ppm. Thus, the overall operating pressure of the RO system dropped to 30 bar to produce fresh product water PW (TDS ~135 ppm) in permeate side 24, with an overall water recovery of 30%. In experiments performed with the above parameters, the seawater feed (generated by first pump 12) had an initial TDS of 42,121 ppm at a flow rate of 600 lph. With second pump 20 operating at 30 bar, the seawater was input into feed side 26 of reverse osmosis desalination unit 22 with a TDS of 20,123 ppm at a flow rate of 1,350 lph. The product water PW exited permeate side 24 of reverse osmosis desalination unit 22 at a flow rate of 180 lph with a conductivity of 192 μS/cm. The TDS of reject stream R output from feed side 26 of reverse osmosis desalination unit 22 was 27,200 ppm, and the brine B had a TDS of 62,542 ppm. In order to process 100 m$^3$ of seawater per day, using a reverse osmosis desalination unit 22 with a Pelton turbine, operating at 80% efficiency, the electrical power required would be 4.0 Kw/m$^3$, with a daily energy expenditure of 480 kWh. For solar power used as a source of energy, the overall area of a grid-connected solar PV system would be about 206 m$^2$, and the area for such a system combined with an off-grid battery would be about 825 m$^2$.

Figure 2:
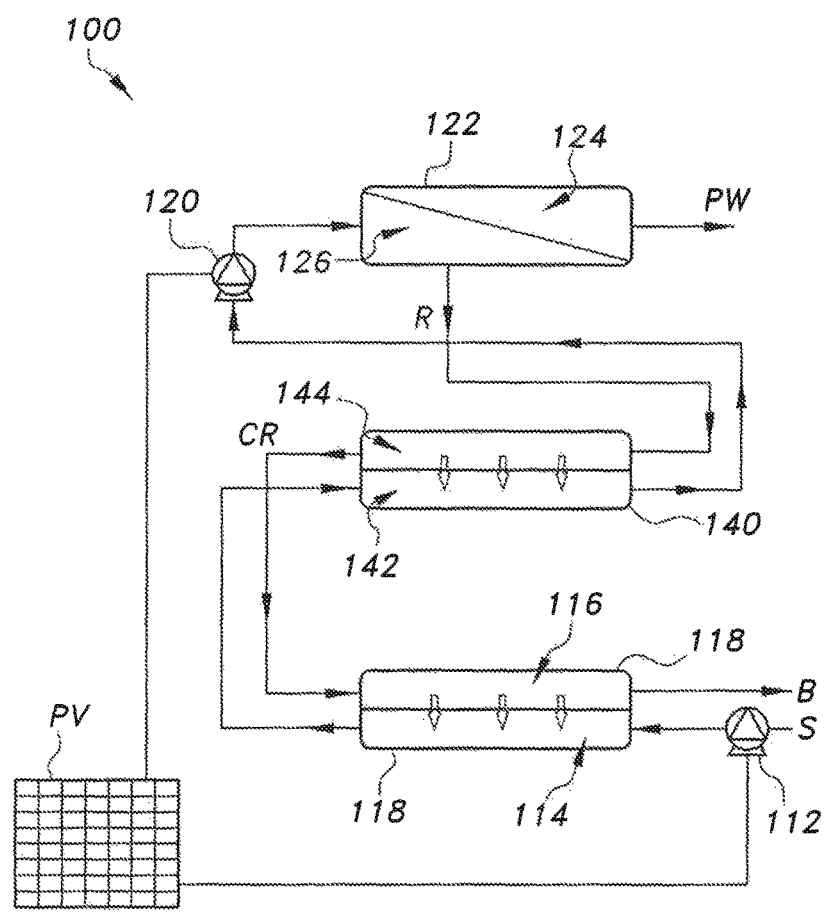
FIG. 2 diagrammatically illustrates an alternative embodiment of the pressure-reduced saline water treatment system.

In the alternative embodiment of FIG. 2, the pressure-reduced saline water treatment system 100 uses a two-stage forward osmosis process. Both a first forward osmosis desalination unit 118, having a draw side 116 and a feed side 114, and a second forward osmosis desalination unit 140, also having a draw side 144 and a feed side 142, are used. As in the previous embodiment, a reverse osmosis desalination unit 122, having a feed side 126 and a permeate side 124, is provided. The feed side 126 of the reverse osmosis desalination unit 122 is in fluid communication with the feed side 142 of the second forward osmosis desalination unit 140, such that the diluted seawater drawn through the feed side 142 of the second forward osmosis desalination unit 140 is fed into the feed side 126 of the reverse osmosis desalination unit 122. The permeate side 124 of the reverse osmosis desalination unit outputs product water PW extracted from the seawater S, and the feed side 126 of the reverse osmosis desalination unit 122 outputs a reject stream R.

The draw side 144 of the second forward osmosis desalination unit 140 is in fluid communication with the feed side 126 of the reverse osmosis desalination unit 122, such that the draw side 144 of the second forward osmosis desalination unit 140 receives the reject stream R and outputs a concentrated reject stream CR. The draw side 116 of the first forward osmosis desalination unit 118 is in fluid communication with the draw side 144 of the second forward osmosis desalination unit 140, such that the draw side 116 of the first forward osmosis desalination unit 118 receives the concentrated reject stream CR and outputs concentrated brine B.

The feed side 114 of the first forward osmosis desalination unit 118 is in fluid communication with the feed side 142 of the second forward osmosis desalination unit 140, such that the seawater S flows through the feed side 114 of the first forward osmosis desalination unit 118 to and through the feed side 142 of the second forward osmosis desalination unit 140. The reject stream R passes through the draw side 144 of the second forward osmosis desalination unit 140 at a higher osmotic and hydraulic pressure than an osmotic pressure of the diluted seawater fed through the feed side 142 of the second forward osmosis desalination unit 140. The concentrated reject stream CR passes through the draw side 116 of the first forward osmosis desalination unit 118 at a higher osmotic and hydraulic pressure than an osmotic pressure of the seawater S fed through the feed side 114 of the first forward osmosis desalination unit 118.

As in the previous embodiment, a first pump 112 delivers the seawater S to the feed side 114 of the first forward osmosis desalination unit 118, and a second pump 120 delivers the diluted seawater from the feed side 142 of the second forward osmosis desalination unit 140 to the feed side 126 of the reverse osmosis desalination unit 122. Also as in the previous embodiment, the first and second pumps 112, 120 may be powered by at least one photovoltaic panel PV or any other suitable source of energy.

In experiments of the pressure-reduced saline water treatment system 100, seawater S was fed, by first pump 112, at a flow rate of 600 lph, with a TDS of 42,121 ppm at an operating pressure of between 1 and 2 bar. The TDS of the seawater S entering feed side of forward osmosis desalination unit 140 was 24,290 ppm, with flow rate of 836 lph. The second pump 120 is operated at 15 bar, with the diluted seawater flowing into feed side 126 of the reverse osmosis desalination unit 122 at a rate of 1186 lph, with a TDS of 15,278 ppm. Product water PW flowed out of permeate side 124 at a rate of 173 lph, with a TDS of ~136 ppm and a conductivity of 160 μS/cm. The TDS of reject stream R was 20,778 ppm, and the TDS of the concentrated reject stream CR was 38,220 ppm. The brine B exited draw side 116 of first forward osmosis desalination unit 118 with a TDS of 64,341 ppm.

Figure 3:
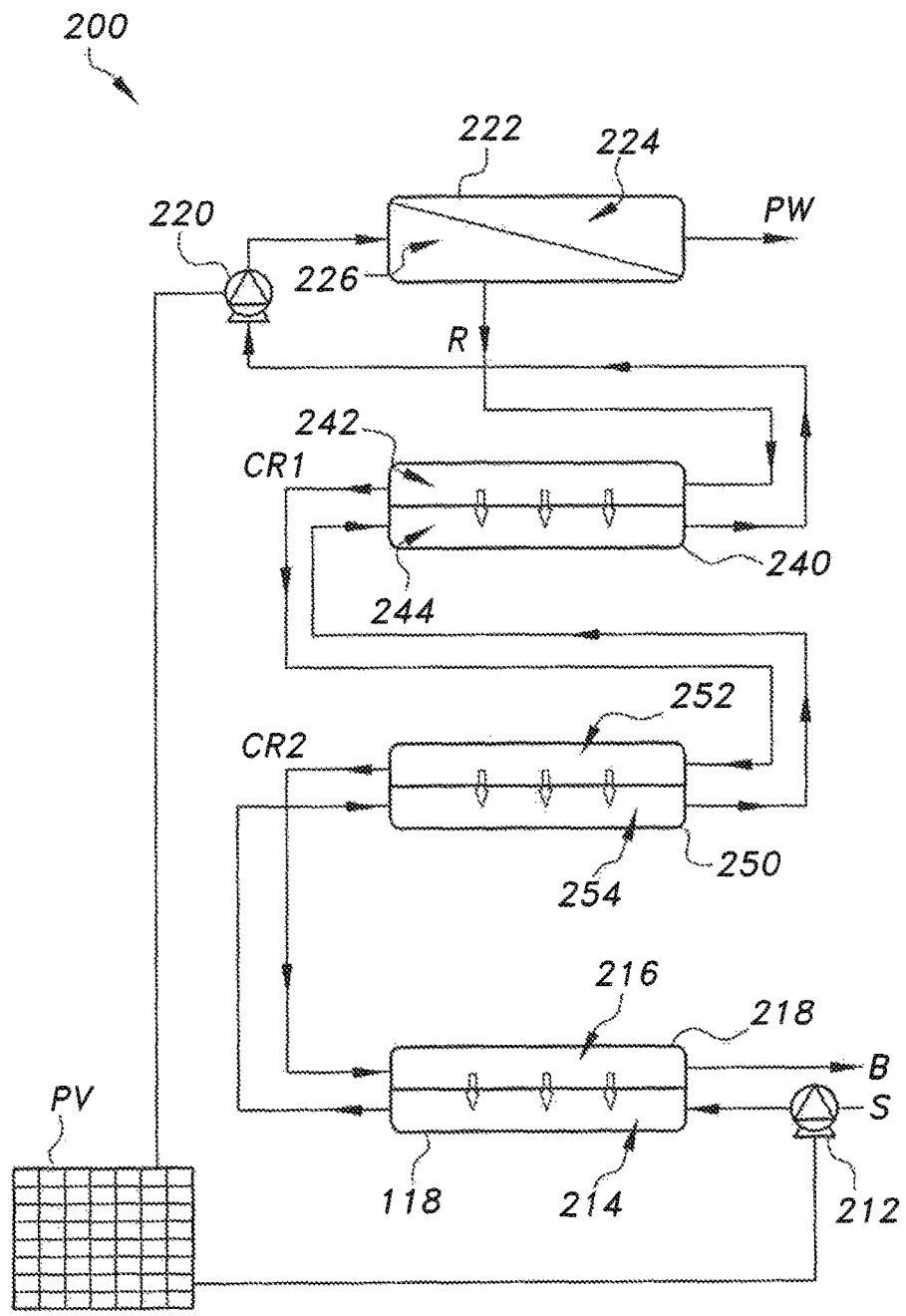
FIG. 3 diagrammatically illustrates another alternative embodiment of the pressure-reduced saline water treatment system.
Figure 4:
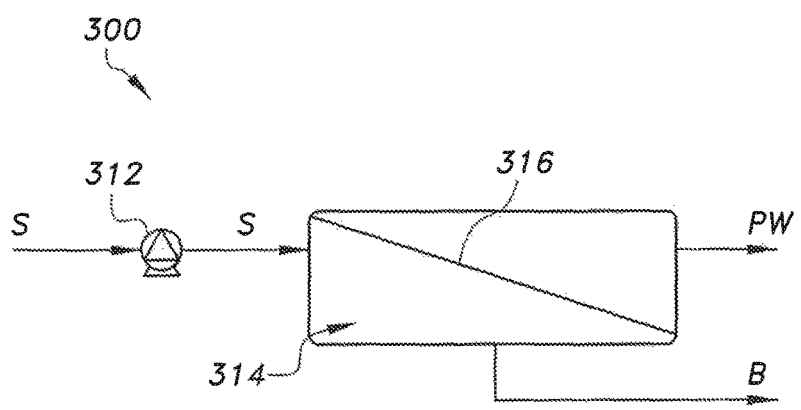
FIG. 4 diagrammatically illustrates a conventional prior art reverse osmosis desalination system.
Figure 5:
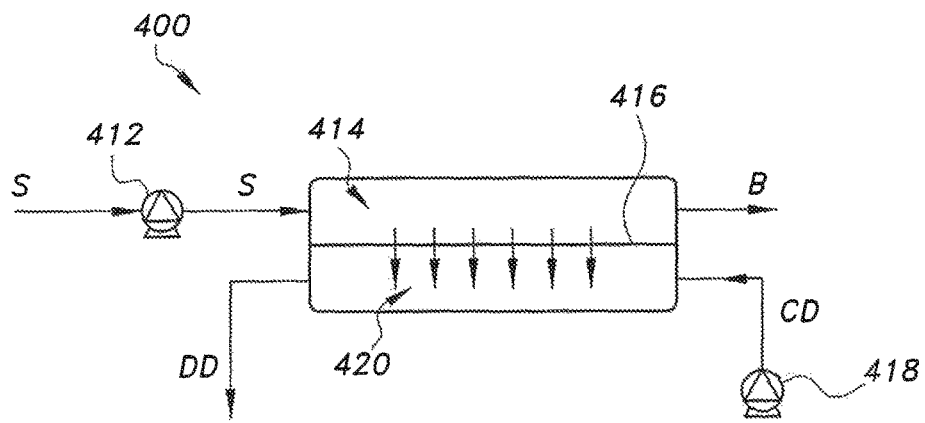
FIG. 5 diagrammatically illustrates a conventional prior art forward osmosis desalination system.

In the further alternative embodiment of FIG. 3, the pressure-reduced saline water treatment system 200 uses a three-stage forward osmosis process. First, second and third forward osmosis desalination units 218, 250, 240, respectively, are used, each having a feed side and a draw side. As in the previous embodiments, a reverse osmosis desalination unit 222, having a feed side 226 and a permeate side 224, is provided. The feed side 226 of the reverse osmosis desalination unit 222 is in fluid communication with the feed side 244 of the third forward osmosis desalination unit 240, such that seawater drawn through the feed side of the third forward osmosis desalination unit 240 is fed into the feed side 226 of the reverse osmosis desalination unit 222. The permeate side 224 of the reverse osmosis desalination unit 222 outputs product water PW extracted from the seawater, and the feed side of the reverse osmosis desalination unit 222 outputs a reject stream R.

The draw side 242 of the third forward osmosis desalination unit 240 is in fluid communication with the feed side 226 of the reverse osmosis desalination unit 222, such that the draw side 242 of the third forward osmosis desalination unit 240 receives the reject stream R and outputs a first concentrated reject stream CR1. The draw side 252 of the second forward osmosis desalination unit 250 is in fluid communication with the draw side 242 of the third forward osmosis desalination unit 240, such that the draw side 252 of the second forward osmosis desalination unit 250 receives the first concentrated reject stream CR1 and outputs a second concentrated reject stream CR2. The draw side 216 of the first forward osmosis desalination unit 218 is in fluid communication with the draw side 252 of the second forward desalination unit 250, such that the draw side 216 of the first forward osmosis desalination unit 218 receives the second concentrated reject stream CR2 and outputs concentrated brine B.

The feed side 214 of the first forward osmosis desalination unit 218 is in fluid communication with the feed side 254 of the second forward osmosis desalination unit 250, such that the seawater S flows through the feed side 214 of the first forward osmosis desalination unit 218 to and through the feed side 254 of the second forward osmosis desalination unit 250. The feed side 254 of the second forward osmosis desalination unit 250 is in fluid communication with the feed side 244 of the third forward osmosis desalination unit 240, such that the seawater flows through the feed side 254 of the second forward osmosis desalination unit 250 to and through the feed side 244 of the third forward osmosis desalination unit 240.

Similar to the previous embodiments, the reject stream R passes through the draw side 242 of the third forward osmosis desalination unit 240 at a higher osmotic and hydraulic pressure than an osmotic pressure of the diluted seawater fed through the feed side 244 of the third forward osmosis desalination unit 240. The first concentrated reject stream CR1 passes through the draw side 252 of the second forward osmosis desalination unit 250 at a higher osmotic and hydraulic pressure than an osmotic pressure of the diluted seawater fed through the feed side 254 of the second forward osmosis desalination unit 250. The second concentrated reject stream CR2 passes through the draw side 216 of the first forward osmosis desalination unit 218 at a higher osmotic and hydraulic pressure than an osmotic pressure of the seawater S fed through the feed side 214 of the first forward osmosis desalination unit 218.

As in the previous embodiments, a first pump 212 delivers the seawater S to the feed side 214 of the first forward osmosis desalination unit 218, and a second pump 220 delivers the diluted seawater from the feed side 244 of the third forward osmosis desalination unit 240 to the feed side 226 of the reverse osmosis desalination unit 222. Also as in the previous embodiments, the first and second pumps 212, 220, respectively, may be powered by at least one photovoltaic panel PV or any other suitable source of energy.

In experiments of the pressure-reduced saline water treatment system 200, seawater S was fed, by first pump 112, at a flow rate of 600 lph, with a TDS of 42,121 ppm, at an operating pressure of between 1 and 2 bar. The flow of diluted seawater, with a TDS of 28,100 ppm and a conductivity of 32,600 μS/cm, into feed side 254 of second forward osmosis desalination unit 250 is at a rate of 550 lph. Second pump 220 operated at 10 bar, with the feed side 244 entering feed side 226 of reverse osmosis desalination unit 222 with TDS of 10,600 ppm, flowing at a rate of 950 lph with a conductivity of 12,312 μS/cm. Product water PW flowed out of permeate side 224 at a rate of 171 lph, with a TDS of ~142 ppm and a conductivity of 192 μS/cm. The TDS of reject stream R was 18,200 ppm, and the TDS of the first concentrated reject stream CR1 was 30,430 ppm. The TDS of the second concentrated reject stream CR2 was 52,130 ppm. The brine B exited draw side 216 of first forward osmosis desalination unit 218 with a TDS of 68,300 ppm.

In order to process 100 m$^3$ of seawater per day, using a reverse osmosis desalination unit 222 with a Pelton turbine, operating at 80% efficiency, the electrical power required would be 2.2 Kw/m$^3$, with a daily energy expenditure of 264 kWh. An overall water recovery of about 30% was achieved with second pump 220 operating at 10 bar. For solar power used as a source of energy, the overall area of a grid-connected solar PV system would be about 115 m$^2$, and the area for such a system combined with an off-grid battery would be about 450 m$^2$.

Table 1 below compares the efficiencies of a conventional RO desalination system ("RO standalone" in Table 1) against system 10 ("RO-single FO" in Table 1), system ("RO-double FO" in Table 1), and system 200 ("RO-triple FO" in Table 1). Table 2 below shows the composition of the seawater feed and the product water from the above-described experiment of the saline water treatment system 10.

TABLE 1

Comparison of Desalination Efficiencies

| Process | Feed TDS (ppm) | Product TDS (ppm) | Feed flow rate (lph) | Product flow rate (lph) | % water recovery |
|---|---|---|---|---|---|
| RO standalone | 42121 | 115 | 1400 | 410 | 10.00 |
| RO-single FO | 42121 | 137 | 600 | 180 | 29.20 |
| RO-double FO | 42121 | 136 | 600 | 173 | 28.83 |
| RO-triple FO | 42121 | 142 | 600 | 171 | 28.50 |

TABLE 2

Comparison of Concentrations of Seawater Feed and Product Water

| Parameter (unit) | Seawater feed | Product water |
|---|---|---|
| pH | 7.4 | 7.2 |
| Conductivity (mS/cm) | 55.4 | 0.29 |
| TDS (ppm) | 35801 | 135 |
| Calcium (mg/L) | 824 | 6.16 |
| Magnesium (mg/L) | 1154 | 5.83 |
| Sulfate (mg/L) | 3600 | 0 |
| Chloride (mg/L) | 26000 | 38 |
| Sodium (mg/L) | 14;800 | 65 |
| Alkalinity (mg/L) | 120 | 4.3 |
| Boron (mg/L) | 2.75 | 0.24 |
| Nitrate (mg/L) | 3.5 | 0.7 |
| Copper (mg/L) | <0.05 | <0.05 |
| Chromium (mg/L) | <0.05 | <0.05 |
| Iron (mg/L) | <0.05 | <0.05 |
| Silica (mg/L) | 16:2 | 0.724 |
| Phosphate (mg/L) | 0.15 | 0.11 |
| Fluoride (mg/L) | 4.3 | 0.13 |

In each of reverse osmosis desalination units 22, 122, 222, any suitable type of semipermeable membranes, with any suitable geometric configurations, may be utilized, such as spiral wound, plate and frame (i.e., flat sheet), hollow fiber modules, or a plurality of stacked or layered sheets or nano-filler-incorporated membranes or nanofibers. The material of synthesis of the reverse osmosis membranes could be, for example, cellulose ester derivatives or other polyamide-type thin film composite membranes or nano-composite membranes. Reverse osmosis membranes with high salt rejection efficiency of greater than 99% for low pressure RO membranes or ultra-low-pressure RO membranes, with operating pressures in the range of 10-30 bar, are suitable. In each of forward osmosis desalination units described above, any suitable type of semipermeable membranes, with any suitable geometric configurations, may be utilized, such as spiral wound, plate and frame (i.e., flat sheet), hollow fiber modules, or a plurality of stacked or layered sheets or nano-filler-incorporated membranes or nanofibers. The thickness of the FO membranes was far less than that of the RO membranes due to the non-pressure requirement of the FO process. The operating pressure of the FO membrane elements for pressure-reduced saline water treatment system 200 are suitable in the range of 10-20 bar. The FO membrane is preferably configured within the membrane module to attain high dispersion of dissolved solids and feed solution throughout the module to attain high permeate flow. Additionally, it should be understood that the membranes can be operated in any suitable configuration, such as cross flow, co-current, counter-current, axial or radial configurations.

It is to be understood that the pressure-reduced saline water treatment system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A pressure-reduced saline water treatment system, comprising:
    a forward osmosis desalination unit having a feed side and a draw side; and
    a reverse osmosis desalination unit having a feed side and a permeate side,
    wherein the feed side of the reverse osmosis desalination unit is in fluid communication with the feed side of the forward osmosis desalination unit, such that seawater drawn through the feed side of the forward osmosis desalination unit is fed into the feed side of the reverse osmosis desalination unit,
    wherein the permeate side of the reverse osmosis desalination unit outputs product water extracted from the seawater, and the feed side of the reverse osmosis desalination unit outputs a reject stream,
    wherein the draw side of the forward osmosis desalination unit is in fluid communication with the feed side of the reverse osmosis desalination unit, such that the draw side of the forward osmosis desalination unit receives the reject stream and outputs concentrated brine, and
    wherein the reject stream passes through the draw side of the forward osmosis desalination unit at a higher osmotic and hydraulic pressure than an osmotic pressure of the seawater fed through the feed side of the forward osmosis desalination unit.

2. The pressure-reduced saline water treatment system as recited in claim 1, further comprising a first pump for delivering the seawater to the feed side of the forward osmosis desalination unit.

3. The pressure-reduced saline water treatment system as recited in claim 2, further comprising a second pump for delivering the seawater from the feed side of the forward osmosis desalination unit to the feed side of the reverse osmosis desalination unit.

4. The pressure-reduced saline water treatment system as recited in claim 3, further comprising at least one photovoltaic panel in electrical communication with the first and second pumps for providing power thereto.

5. A pressure-reduced saline water treatment system, comprising:
    a first forward osmosis desalination unit having a feed side and a draw side;
    a second forward osmosis desalination unit having a feed side and a draw side; and
    a reverse osmosis desalination unit having a feed side and a permeate side,
    wherein the feed side of the reverse osmosis desalination unit is in fluid communication with the feed side of the second forward osmosis desalination unit, such that seawater drawn through the feed side of the second forward osmosis desalination unit is fed into the feed side of the reverse osmosis desalination unit,
    wherein the permeate side of the reverse osmosis desalination unit outputs product water extracted from the seawater, and the feed side of the reverse osmosis desalination unit outputs a reject stream,
    wherein the draw side of the second forward osmosis desalination unit is in fluid communication with the feed side of the reverse osmosis desalination unit, such that the draw side of the second forward osmosis desalination unit receives the reject stream and outputs a concentrated reject stream,
    wherein the draw side of the first forward osmosis desalination unit is in fluid communication with the draw side of the second forward osmosis desalination unit, such that the draw side of the first forward osmosis desalination unit receives the concentrated reject stream and outputs concentrated brine,
    wherein the feed side of the first forward osmosis desalination unit is in fluid communication with the feed side of the second forward osmosis desalination unit, such that the seawater flows through the feed side of the first forward osmosis desalination unit to and through the feed side of the second forward osmosis desalination unit,
    wherein the reject stream passes through the draw side of the second forward osmosis desalination unit at a higher osmotic and hydraulic pressure than an osmotic pressure of the diluted seawater fed through the feed side of the second forward osmosis desalination unit, and
    wherein the concentrated reject stream passes through the draw side of the first forward osmosis desalination unit at a higher osmotic and hydraulic pressure than an osmotic pressure of the seawater fed through the feed side of the first forward osmosis desalination unit.

6. The pressure-reduced saline water treatment system as recited in claim 5, further comprising a first pump for delivering the seawater to the feed side of the first forward osmosis desalination unit.

7. The pressure-reduced saline water treatment system as recited in claim 6, further comprising a second pump for delivering the seawater from the feed side of the second forward osmosis desalination unit to the feed side of the reverse osmosis desalination unit.

8. The pressure-reduced saline water treatment system as recited in claim 7, further comprising at least one photovoltaic panel in electrical communication with the first and second pumps for providing power thereto.

9. A pressure-reduced saline water treatment system, comprising:
    a first forward osmosis desalination unit having a feed side and a draw side;
    a second forward osmosis desalination unit having a feed side and a draw side;
    a third forward osmosis desalination unit having a feed side and a draw side; and a reverse osmosis desalination unit having a feed side and a permeate side, wherein the feed side of the reverse osmosis desalination unit is in fluid communication with the feed side of the third forward osmosis desalination unit, such that seawater drawn through the feed side of the third forward osmosis desalination unit is fed into the feed side of the reverse osmosis desalination unit, wherein the permeate side of the reverse osmosis desalination unit outputs product water extracted from the seawater, and the feed side of the reverse osmosis desalination unit outputs a reject stream, wherein the draw side of the third forward osmosis desalination unit is in fluid communication with the feed side of the reverse osmosis desalination unit, such that the draw side of the third forward osmosis desalination unit receives the reject stream and outputs a first concentrated reject stream, wherein the draw side of the second forward osmosis desalination unit is in fluid communication with the draw side of the third forward osmosis desalination unit, such that the draw side of the second forward osmosis desalination unit receives the first concentrated reject stream and outputs a second concentrated reject stream, wherein the draw side of the first forward osmosis desalination unit is in fluid communication with the draw side of the second forward desalination unit, such that the draw side of the first forward osmosis desalination unit receives the second concentrated reject stream and outputs concentrated brine, wherein the feed side of the first forward osmosis desalination unit is in fluid communication with the feed side of the second forward osmosis desalination unit, such that the seawater flows through the feed side of the first forward osmosis desalination unit to and through the feed side of the second forward osmosis desalination unit, wherein the feed side of the second forward osmosis desalination unit is in fluid communication with the feed side of the third forward osmosis desalination unit, such that the seawater flows through the feed side of the second forward osmosis desalination unit to and through the feed side of the third forward osmosis desalination unit, wherein the reject stream passes through the draw side of the third forward osmosis desalination unit at a higher osmotic and hydraulic pressure than an osmotic pressure of the diluted seawater fed through the feed side of the third forward osmosis desalination unit, wherein the first concentrated reject stream passes through the draw side of the second forward osmosis desalination unit at a higher osmotic and hydraulic pressure than an osmotic pressure of the diluted seawater fed through the feed side of the second forward osmosis desalination unit, and wherein the second concentrated reject stream passes through the draw side of the first forward osmosis desalination unit at a higher osmotic and hydraulic pressure than an osmotic pressure of the seawater fed through the feed side of the first forward osmosis desalination unit.

10. The pressure-reduced saline water treatment system as recited in claim 9, further comprising a first pump for delivering the seawater to the feed side of the first forward osmosis desalination unit.

11. The pressure-reduced saline water treatment system as recited in claim 10, further comprising a second pump for delivering the seawater from the feed side of the third forward osmosis desalination unit to the feed side of the reverse osmosis desalination unit.

12. The pressure-reduced saline water treatment system as recited in claim 11, further comprising at least one photovoltaic panel in electrical communication with the first and second pumps for providing power thereto.

* * * * *